J. C. COLE.
DEMOUNTABLE RIM.
APPLICATION FILED DEC. 27, 1910.

1,040,275.

Patented Oct. 8, 1912.

WITNESSES:
F. L. Sprague
Harry W. Bowen.

INVENTOR,
John Clarence Cole.
BY
Chapin & Co.
ATTORNEY.

UNITED STATES PATENT OFFICE.

JOHN CLARENCE COLE, OF CHICOPEE FALLS, MASSACHUSETTS, ASSIGNOR TO FISK RUBBER COMPANY OF CHICOPEE FALLS, MASSACHUSETTS, A CORPORATION.

DEMOUNTABLE RIM.

1,040,275.      Specification of Letters Patent.      Patented Oct. 8, 1912.

Application filed December 27, 1910. Serial No. 599,447.

*To all whom it may concern:*

Be it known that I, JOHN CLARENCE COLE, a citizen of the United States of America, residing at Chicopee Falls, in the county of Hampden and State of Massachusetts, have invented new and useful Improvements in Demountable Rims, of which the following is a specification.

This invention relates to the construction of metal rims for resilient tires and particularly to demountable rims for clencher and analogous tires in which the bead on the base of the tire engages the sides of a channel in the rim. When this type of tires is made in the large sizes, especially, the base and body of the tire are very rigid and the outer diameter of the rim, measured from the upturned edges thereof, is greater than the internal diameter of the tire, and the latter, being relatively inelastic, is with difficulty passed over the edge of the rim and thus seated in the channel in the latter, adapted to receive said base. To overcome this, the rims have heretofore been divided circumferentially and the two parts fitted to the beaded sides of the base and locked together by a suitable locking device.

The object of the present invention is to provide a circumferentially divided demountable rim and locking means to secure the two parts together, which shall be as light as possible as is consistent with strength, and in which the locking device is simple and efficient, and so constructed that when the rim is provided with its tire and the latter is inflated for use, the pressure of the base against the rim will serve to prevent movement of the locking device, whereby the two parts of the rim might be blown apart by the air pressure in the tire, a result which might be attended with serious results. This automatic locking of the locking device against easy displacement makes this type of rim one which can be safely handled with an inflated tire mounted thereon, and one which can be safely carried on a vehicle on any desired place.

The invention is clearly illustrated in the accompanying drawings, and fully described in the following specification and pointed out in the claims appended thereto.

Figure 4:
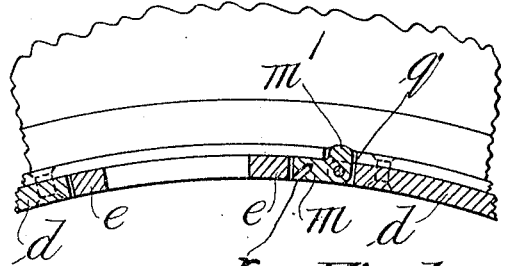
Figure 5:
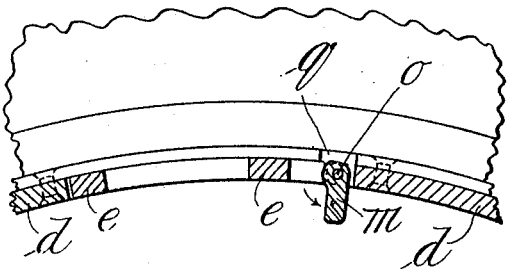
Figure 1:
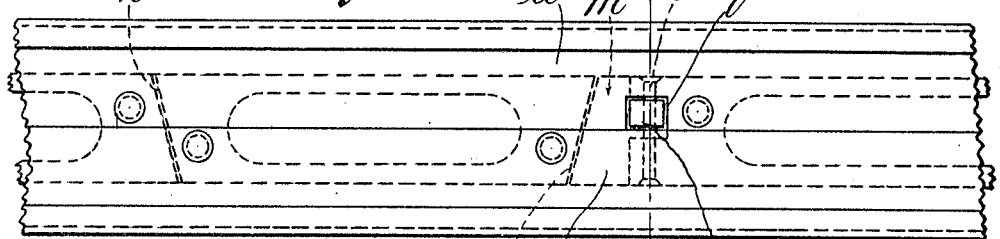
Figure 2:
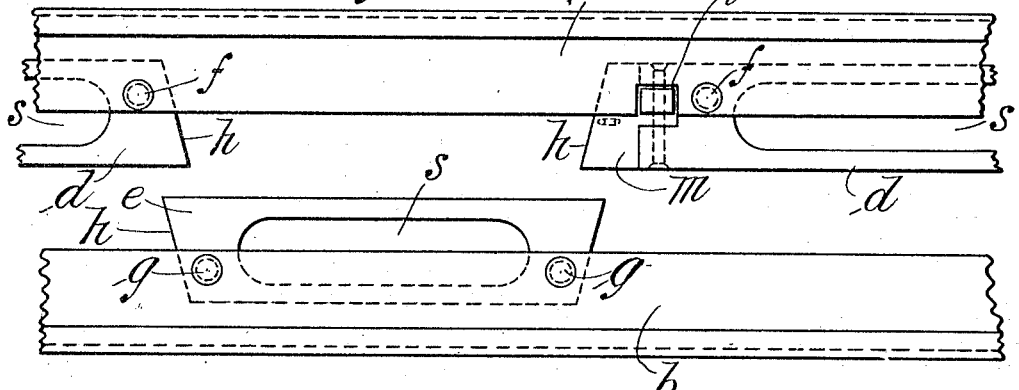
Figure 3:
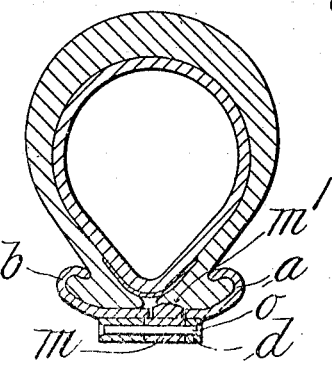

In these drawings,—Figure 1 is a plan view of a portion of a rim embodying the invention, showing the two parts of the rim in operative relation one to the other, the locking device being shown partly in full lines and partly in dotted lines. Fig. 2 shows also in plan view the two parts of the rim shown in separated relation. Fig. 3 is a cross sectional view of the rim on line 3—3, Fig. 1, and shows also a tire in place on said rim. Fig. 4 is a longitudinal section of the rim and a portion of a tire, the line of the section being taken on the line of partition between the two parts of the rim. This view shows the locking device in position to lock the two parts of the rim together. Fig. 5 is a longitudinal section like Fig. 4 in all respects except that the locking device is shown in the position it occupies when the rim-parts are unlocked. Figs. 4 and 5 are on a somewhat smaller scale than Figs. 1 and 2.

Referring to the drawings, $a$ indicates one part of the circumferentially divided rim, and $b$ the other part thereof, the partition line $c$ being preferably so located as to divide the rim into substantially two equal parts. On the parts $a$ and $b$, the metal strips $d$ and $e$ are respectively riveted, as at $f$ on the part $a$, and $g$ on the part $b$. Preferably, the strips $d$, for example, are made longer than the strip $e$ so that there might be, for instance, four relatively long strips $d$ and four relatively short ones $e$. Each end of each of the strips $d$ and $e$ flares outwardly from its respective parts $a$ and $b$ of the rim, these angularly disposed ends being straight and are indicated by $h$, the angles being the same on each strip. By referring to Fig. 1, it will be seen that when these two rim parts $a$ and $b$ are assembled in operative relation, the strips $d$ and $e$ dovetail together, and to permit this assemblage at those points around the circumference of the rim where the strips on one rim part enter between the ends of the strips on the other part, one end of one of the strips is cut off and a member is hinged to that end of the strip from which a piece is cut, and is adapted to swing down toward the axis of the rim, whereby an opening is provided wide enough to permit the dovetail strip on one rim part to enter between the dovetail ends of the strips on the other. This hinged part of the strip is indicated by $m$, and it is hinged to the end of the strip by a pin $o$ in such relation thereto that when it is swung up flush with said strip, as shown in Fig. 1, the inclined edge thereof will fit closely against the adjacent inclined edge of the strip on the other part of the rim, thus locking the two rim parts together. This hinged part $m$ of the strip $d$ is made with an offset rectangular extension $p$ which fits in a like recess cut out of the end of the strip, and the pin $o$, on which the part $m$ swings, passes through the end of the strip and through this rectangular extension $p$.

Now to provide means for holding the hinged part $m$ against displacement before it is mounted on a wheel, the rectangular extension $m$ of said part is made a little higher than the rest of said part, as shown at $m^1$— enough higher in fact to extend through an opening $q$ in the rim part as seen most clearly in Figs. 1 to 4 inclusive, and project slightly beyond the surface of said rim part. This opening is located in that part of the rim on which the base of the tire is seated, and a little one side of the center line of the rim whereby this raised portion $m^1$ of the hinge will come under one of the beads of the base, as seen in Fig. 3. It will be observed that the surface of this part $m^1$ is flattened where the base of the tire bears thereon, and that it is located directly over the pin $o$. Therefore, when the tire is inflated, the air pressure therein will force the base of the tire so strongly against this part $m^1$ as to hold it immovably in place flush with the strip to which it is hinged, thus permitting the inflated tire to be handled with entire safety.

When the tire is deflated, the hinged part $m$ of the structure may be readily swung down to the position shown in Fig. 5 and thus permit the easy separation of the rim parts. When the tire is in a deflated condition, the base thereof will bear with more or less pressure against the rim and thus act as a sort of spring detent for the hinged part $m$, whether it is in the position shown in Fig. 4 or Fig. 5. For convenience in swinging the hinged part $m$ down to the unlocking position, a hole $r$ may, if desired, be drilled in the under side thereof to permit the entrance of a tool to pry said part out of operative position.

As stated above, the structure herein described is for use primarily as a demountable rim, viz.,—a rim on which a vehicle tire may be mounted ready for use and which may be quickly fitted to the fixed rim of a wheel by any one of the various well known methods, and when the herein described rim is in place on the wheel, the hinged part $m$, (the under side of which is practically flush with the inner surface of the demountable rim) will be held against displacement by the fixed rim over which the demountable rim is fitted, as well as by the pressure of the base of the tire against the surface of the projection $m^1$.

When the rim parts are assembled together, as in Fig. 1, the lateral pressure to which they are subjected by the inflation of the tire is resisted by the dovetailed engagement of the strips $d$ and $e$. These have been described as secured to the rim parts, but may be made integral therewith if desired. While the lateral pressure against the rim parts may be very considerable when the tire is inflated, the pin $o$, on which the part $m$ swings, does not have to bear this pressure owing to the relative slight angularity of the dovetailed ends of the strips $d$ and $e$, whereby said pressure merely tends to force said hinged part $m$ against the end of the strip to which it is hinged. For the purpose of lightening the structure, the strips $d$ and $e$ may be cut away, if desired, as indicated in Figs. 1 and 2 by $s$.

Where the word "dovetail" is used herein it is intended to mean the interlocking of the rim parts in the manner characteristic of the dovetail lock, and not specifically the form of dovetail shown and described, since it would be possible, of course, to vary the configuration of the spaces cut in the rim and the like variation of the projections to fit these spaces and still provide an operative embodiment of the invention.

What I claim, is:—

1. A rim for clencher and analogous tires circumferentially divided into two cylindrical parts having the same diameter and movable one toward the other into interlocking relation, one of said parts having dovetailed projections thereon located opposite dovetailed openings in the other part, and a movable part on said projections to temporarily reduce the length thereof to permit the entrance of the projections in the openings in the other part of the rim when the two parts are moved one toward the other.

2. A rim for clencher and analogous tires circumferentially divided into two parts, each rim part having projections on one part extending toward openings in the opposite rim part, said openings being normally narrower than said projections, means to temporarily reduce the length of said projections comprising a movable part constituting one of the ends of the projections, said part serving, when located flush with the projections, to restore their normal outline, said part having a bearing against the base of the tire to lock the part against easy displacement.

3. A rim for clencher and analogous tires circumferentially divided into two parts, each rim part having outwardly flaring

UNITED STATES PATENT OFFICE.

JOHN CLARENCE COLE, OF CHICOPEE FALLS, MASSACHUSETTS, ASSIGNOR TO FISK RUBBER COMPANY OF CHICOPEE FALLS, MASSACHUSETTS, A CORPORATION.

DEMOUNTABLE RIM.

1,040,275.  Specification of Letters Patent.  Patented Oct. 8, 1912.

Application filed December 27, 1910. Serial No. 599,447.

*To all whom it may concern:*

Be it known that I, JOHN CLARENCE COLE, a citizen of the United States of America, residing at Chicopee Falls, in the county of Hampden and State of Massachusetts, have invented new and useful Improvements in Demountable Rims, of which the following is a specification.

This invention relates to the construction of metal rims for resilient tires and particularly to demountable rims for clencher and analogous tires in which the bead on the base of the tire engages the sides of a channel in the rim. When this type of tires is made in the large sizes, especially, the base and body of the tire are very rigid and the outer diameter of the rim, measured from the upturned edges thereof, is greater than the internal diameter of the tire, and the latter, being relatively inelastic, is with difficulty passed over the edge of the rim and thus seated in the channel in the latter, adapted to receive said base. To overcome this, the rims have heretofore been divided circumferentially and the two parts fitted to the beaded sides of the base and locked together by a suitable locking device.

The object of the present invention is to provide a circumferentially divided demountable rim and locking means to secure the two parts together, which shall be as light as possible as is consistent with strength, and in which the locking device is simple and efficient, and so constructed that when the rim is provided with its tire and the latter is inflated for use, the pressure of the base against the rim will serve to prevent movement of the locking device, whereby the two parts of the rim might be blown apart by the air pressure in the tire, a result which might be attended with serious results. This automatic locking of the locking device against easy displacement makes this type of rim one which can be safely handled with an inflated tire mounted thereon, and one which can be safely carried on a vehicle on any desired place.

The invention is clearly illustrated in the accompanying drawings, and fully described in the following specification and pointed out in the claims appended thereto.

In these drawings,—Figure 1 is a plan view of a portion of a rim embodying the invention, showing the two parts of the rim in operative relation one to the other, the locking device being shown partly in full lines and partly in dotted lines. Fig. 2 shows also in plan view the two parts of the rim shown in separated relation. Fig. 3 is a cross sectional view of the rim on line 3—3, Fig. 1, and shows also a tire in place on said rim. Fig. 4 is a longitudinal section of the rim and a portion of a tire, the line of the section being taken on the line of partition between the two parts of the rim. This view shows the locking device in position to lock the two parts of the rim together. Fig. 5 is a longitudinal section like Fig. 4 in all respects except that the locking device is shown in the position it occupies when the rim-parts are unlocked. Figs. 4 and 5 are on a somewhat smaller scale than Figs. 1 and 2.

Referring to the drawings, $a$ indicates one part of the circumferentially divided rim, and $b$ the other part thereof, the partition line $c$ being preferably so located as to divide the rim into substantially two equal parts. On the parts $a$ and $b$, the metal strips $d$ and $e$ are respectively riveted, as at $f$ on the part $a$, and $g$ on the part $b$. Preferably, the strips $d$, for example, are made longer than the strip $e$ so that there might be, for instance, four relatively long strips $d$ and four relatively short ones $e$. Each end of each of the strips $d$ and $e$ flares outwardly from its respective parts $a$ and $b$ of the rim, these angularly disposed ends being straight and are indicated by $h$, the angles being the same on each strip. By referring to Fig. 1, it will be seen that when these two rim parts $a$ and $b$ are assembled in operative relation, the strips $d$ and $e$ dovetail together, and to permit this assemblage at those points around the circumference of the rim where the strips on one rim part enter between the ends of the strips on the other part, one end of one of the strips is cut off and a member is hinged to that end of the strip from which a piece is cut, and is adapted to swing down toward the axis of the rim, whereby an opening is provided wide enough to permit the dovetail strip on one rim part to enter between the dovetail ends